United States Patent Office 2,974,157
Patented Mar. 7, 1961

2,974,157

CYCLOPENTADIENYL VINYL SILANES AND PROCESS FOR MAKING SAME

Victor B. Jex, Buffalo, N.Y., assignor to Union Carbide Corporation, a corporation of New York No Drawing. Filed Aug. 4, 1954, Ser. No. 447,911

7 Claims. (Cl. 260—448.8)

This invention relates to cyclopentadienyl silanes and in particular to a process for making cyclopentadienyl silanes.

Cyclopentadienyl silanes may be employed in a variety of ways in the formation of useful materials. The cyclopentadienyl chloro and alkoxy silanes may be hydrolyzed alone to form polymeric silicon compounds or may be cohydrolyzed with other chloro and alkoxy silanes. In such polymers the reactive cyclopentadienyl group provides a means for low temperature cross-linking and curing of the polysiloxanes. The cyclopentadiene group reacts as a diene and will react with itself or with other dienophiles such as maleic anhydride, vinylsilanes, and styrene. When reacted with maleic anhydride a dicarboxylic acid anhydride results and the resultant compound may be employed to make silicon containing alkyd resins.

I have now found that cyclopentadienyl silanes may be made by reacting sodium cyclopentadiene with a silane containing at least one chlorine or other halogen atom attached to a silicon atom, the reaction proceeding according to the equation

$$C_5H_5Na + Cl-Si\equiv \rightarrow C_5H_5Si\equiv + NaCl$$

In the formula Cl—Si≡, the three open valences may be filled by chlorine atoms, alkoxy radicals, alkyl radicals, phenyl radicals, vinyl radicals, and various combinations of these atoms and radicals. An essential requirement for the silane is that one chlorine or other halogen atom be attached to the silicon atom.

I have used the following chloro silanes with success: tetrachloro silane ($SiCl_4$), methyl trichloro silane ($CH_3SiCl_3$), vinyl trichloro silane $C_2H_3SiCl_3$ and phenyl trichloro silane $C_6H_5SiCl_3$. I have also used vinyl diethoxy chloro silane $C_2H_3Si(OC_2H_5)_2Cl$, and diethoxy dichloro silane with somewhat less success. In these latter two cases the product was isolated but on analysis proved to be impure.

The reaction of sodium cyclopentadiene with chloro silanes is a strongly exothermic reaction. Because of this, the reaction is difficult to control in the absence of a diluent. Although the reaction proceeds in the absence of a diluent, a solvent medium for the reaction facilitates control of the reaction temperature. A solvent for the reaction also helps to control the rate of the reaction, and, in the case where the silane contains more than one silanic halogen atom, the solvent diluent helps to control the course of the reaction, i.e., replacement of one or more of the silanic halogen atoms by cyclopentadienyl radicals. In addition to these advantages the presence of the solvent facilitates filtration, after the reaction has run its course, of the sodium halide salts produced in the reaction.

In general the suitable solvents for the formation of sodium cyclopentadiene are the solvents disclosed in the application of Lynch and Brantley, S.N. 381,970, and assigned to the same assignee as the present application. Among these solvents are diethyl ether, ethylene glycol methyl phenyl ether, propylene glycol dimethyl ether, diethyl acetal, methyl phenyl ether, methyl morpholine, triethylamine, benzene, alkylene and polyalkylene glycol dialkyl ethers such as the ethylene glycol dimethyl and diethyl ethers and the di-, tri- and tetra-ethylene glycol dialkyl ethers, as exemplified by diethylene glycol dimethyl ether and tetraethylene glycol dimethyl ether. Certain cyclic ethers such as dioxane and tetrahydrofuran are also suitable solvents. All of these solvents should be substantially water and alcohol free and an inert atmosphere such as oxygen free argon or nitrogen should be employed.

Inasmuch as higher temperatures are inadvisable and the reaction is strongly exothermic the reactants should be mixed slowly and carefully and the reaction vessel cooled. I prefer to add a slurry of the sodium cyclopentadiene to a solution of the halosilane in a suitable solvent, such as those previously described, while the reaction vessel is immersed in a cooling bath. An ice bath has proved satisfactory.

After the reaction has ceased the sodium halide salts may be removed by filtration. It is to be noted that the filtered salts always contain a small amount of flammable material which appears to be sodium cyclopentadiene. This flammable material may conveniently be destroyed by reaction with alcohol.

In practicing my invention two precautions are necessary: all steps of the method should take place under conditions which exclude oxygen; and all steps of the method should take place in a medium substantially free of water and alcohols. Small amounts of oxygen, alcohol and water cause decreased yields; large amounts, particularly of oxygen, can lead to fires.

The cyclopentadienyl product may be recovered by stripping the solvent under reduced pressure, leaving the product behind, followed by fractional distillation of the product. In order to repress the formation of polymeric residues it is preferred that the fractional distillation be done at less than atmospheric pressures. Although the reaction proceeds satisfactorily in the higher boiling ethers, the higher boiling points make it difficult to recover the product because of the tendency of the cyclopentadienyl silanes to polymerize at the higher temperatures necessary to strip these solvents.

In general all of the solvents enumerated as suitable for the reaction of sodium and cyclopentadiene are operative as solvents for the reaction between sodium cyclopentadiene and a halo-silane. I prefer to use the lower boiling ethers as solvents; particularly diethyl ether.

In the method of my invention the reactants, sodium cyclopentadiene and the halo-silane, are mixed whereupon reaction ensues. I find it convenient to employ more than an equivalent amount of the halo-silane in order to assure maximum reaction of the sodium cyclopentadiene. Since sodium cyclopentadiene is very reactive, and reaction with oxygen can lead to fires, it is desirable that only small amounts of unreacted sodium cyclopentadiene be present after the reaction has run its course. This is particularly helpful when the sodium chloride formed in the reaction is separated from the solvent and reaction product by filtration, for the halo-silanes and the cyclopentadienyl silane products are liquids whereas the sodium cyclopentadiene is a solid and is filtered off with the sodium chloride.

When it is desired to replace less than all of the halogen atoms on a halo-silane containing two or more halogen atoms, a solvent for the reaction should be employed; the sodium cyclopentadiene is utilized in, or less than, stoichiometric amount; and the sodium cyclopentadiene should be added to the solution containing the silane in order to assure maximum conversion to the desired product.

The temperature at which the reaction is run is not critical, however, higher temperatures favor polymerization through the unsaturated groups of the cyclopentadienyl radicals. Because of this I prefer to keep the temperature during the course of the reaction below about 30° C. Although higher temperatures are feasible, the yield of the cyclopentadienyl silane is reduced at higher temperatures. For this reason I prefer to run the reaction in the temperature range from about −78° C. to 30° C.

I have discovered that my process for making cyclopentadienyl silanes, which comprises reacting, in a substantially oxygen, water and alcohol free medium, sodium cyclopentadiene with a silane having at least one halogen atom attached to a silicon atom may be applied to make new cyclopentadienyl silanes of the formula $$(CPD)_m R_n SiX_{4-m-n}$$

wherein CPD is a cyclopentadienyl radical, R is a vinyl radical and X is chloro and ethoxy, $m$ has the values 1, 2, and 3, $n$ has the values 1, 2, and 3, and $m+n$ equals at most, 4.

These vinyl cyclopentadienyl silanes are more useful and versatile compounds than the methyl or phenyl cyclopentadienyl silanes. In addition to the uses that may be made of the reactive cyclopentadienyl radical the vinyl group provides a path through which more complex cyclopentadienyl silicon compounds may be made. The vinyl group can be made to react with a hydrogen atom attached to a silicon atom as illustrated by $$\equiv SiH + CH_2 = CH - Si \equiv \rightarrow \equiv SiCH_2CH_2Si \equiv$$

thus leading to new cyclopentadienyl silicon compounds of a variety of types and uses. In illustration, if the product of the above indicated reaction is of the type $$ClR_2SiCH_2CH_2Si(CPD)_2Cl$$

the resultant compound may be hydrolyzed to form silicon polymers and the cyclopentadiene group later used for low temperature curing of the resultant polymer.

In addition to these vinyl cyclopentadienyl silanes I have also been able to apply my process to make cyclopentadienyl silanes of the formula $$(CPD)SiX_3$$

where X is chloro and ethoxy.

These silanes, because of the three reactive groups subject to hydrolysis (the chloro or ethoxy groups) may be used to provide branched chain cyclopentadienyl polysiloxanes. By adding selected amounts of the trifunctional cyclopentadienyl trichloro or triethoxy silane to difunctional silanes the amount of cross-linking through Si—O—Si bonds may be controlled. The partially cross-linked resin may later be cured by making use of the reactive cyclopentadienyl radicals.

The following examples are illustrative:

EXAMPLE I

*Preparation of cyclopentadienyl trichloro silane*

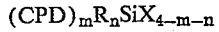

A sodium cyclopentadiene slurry was prepared by adding a slight excess of freshly distilled cyclopentadiene to a stirred dispersion of sodium, 1 mole (23 g.) in amount, in diethyl ether at a temperature of 20° C. to 25° C. Hydrogen gas was evolved during the addition. The slurry of sodium cyclopentadiene thus prepared was slowly added, with vigorous stirring, to a 50 mole percent excess of silicon tetrachloride in ether. During this addition the temperature in the reaction vessel was maintained below 30° C. by external cooling. Reaction was evidenced by the precipitation of a white solid which was filtered off and washed with ether. The filtrate and washings were desolvated under reduced pressure and the residue was fractionally distilled to give a 56 weight percent yield, based on the sodium charge, of a colorless liquid boiling at 58° C. at 10 mm. of Hg. This liquid was identified as cyclopentadienyl trichloro silane. The theoretical hydrolyzable chlorine for cyclopentadienyl trichloro silane is 53.3 percent. Analysis showed 53.1 percent hydrolyzable chlorine. The density of the liquid was 1.370 and its refractive index, $n_D^{25}$, 1.5212.

In all steps of this example precautions were taken to exclude oxygen, alcohol and water from the reactants.

EXAMPLE II

Following the same procedure as in Example I, a 47 weight percent yield, based on sodium charge, of cyclopentadienyl trichloro silane was obtained.

EXAMPLE III

*Preparation of cyclopentadienyl triethoxy silane*

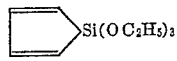

Cyclopentadienyl triethoxy silane was prepared from cyclopentadienyl trichloro silane, prepared by the method of Example I. Cyclopentadienyl trichloro silane (1.33 moles) was dissolved in 300 ml. of ether. Four moles of absolute ethanol were added to this solution with vigorous stirring. Hydrogen chloride was evolved during this addition. After the addition of the ethanol the reaction mixture was sparged with a slow stream of dry nitrogen in order to remove most of the remaining hydrogen chloride. The esterification was then completed by bubbling a stream of anhydrous ammonia into the reaction mixture until the mixture was basic to moistened litmus, and then slowly adding an additional one-half mole of absolute ethanol. The solid ammonium chloride produced in the reaction was then removed from the reaction mixture by filtering. Fractional distillation of the filtrate gave a colorless liquid boiling at 70° C. at 4 mm. of Hg, with $d_{25}=0.988$, and $n_D^{25}=1.4477$. Analysis showed the compound to be cyclopentadienyl triethoxy silane. The calculated percentages for cyclopentadienyl triethoxy silane are: C, 57.9; H, 8.8; Si, 12.3; $OC_2H_5$, 59.2. The percentages found are C, 57.7 and 56.9; H, 8.6 and 9.0; Si 12.0 and 12.7; $OC_2H_5$, 51.8 and 54.7.

EXAMPLE IV

*Preparation of cyclopentadienyl vinyl dichloro silane*

A slurry of sodium cyclopentadiene in ether was slowly added with vigorous stirring to a 50 mole percent excess of a solution of vinyl trichloro silane in ether. The temperature was maintained at 20 to 25° C. by external cooling. During the reaction a yellowish solid formed; this solid was removed by filtering. Fractional distillation yielded a colorless liquid which quickly turned to brown on contact with air. The liquid was identified as cyclopentadienyl vinyl dichloro silane. The theoretical hydrolyzable chlorine for this compound is 37.1 percent; 36.5 percent was found. The compound boiled at 30–35° C. under 1 mm. of Hg and had a $d_{25}$ of 1.19 and a $n_D^{25}$ of 1.5150. Oxygen, alcohol and water were excluded during the steps of the reaction.

EXAMPLE V

*Preparation of cyclopentadienyl phenyl dichloro silane*

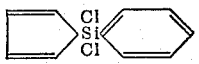

A slurry of sodium cyclopentadiene in xylene was slowly added with vigorous stirring to a 12 mole percent excess of phenyl trichloro silane in ether. External cooling maintained the temperature at 20 to 25° C. during the addition. The solids formed during the reaction were removed by filtering. Fractional distillation of the filtrate gave a 55 percent yield, based on sodium added, of cyclopentadienyl phenyl dichloro silane with a boiling point of 83° C. at 0.5 mm., and $n_D^{25}$ of 1.6822. The theoretical hydrolyzable chlorine is 29.4 percent; found 29.2 percent. Oxygen, alcohol and water were excluded during the steps of preparation.

What is claimed is:

1. As new compositions, the cyclopentadienyl vinyl silanes of the formula $$(CPD)_m R_n SiX_{4-m-n}$$

wherein CPD is a cyclopentadienyl radical, R is a vinyl radical and X is selected from the group consisting of chloro and ethoxy, $m$ has the values 1, 2 and 3, $n$ has the values 1, 2, and 3, and $m+n$ equals, at most, 4.

2. As new compositions, the cyclopentadienyl vinyl silanes of the formula $$(CPD)_m R_n SiX_{4-m-n}$$

wherein CPD is a cyclopentadienyl radical, R is a vinyl radical and X is chloro, $m$ has the values 1, 2 and 3, $n$ has the values 1, 2, and 3, and $m+n$ equals, at almost, 4.

3. As a new composition, cyclopentadienyl vinyl dichloro silane.

4. As a new composition, cyclopentadienyl vinyl diethoxy silane.

5. The process for making cyclopentadienyl vinyl silanes having the formula $$(CPD)_m R_n SiX_{4-m-n}$$

wherein CPD is a cyclopentadienyl radical, R is a vinyl radical and X is selected from the group consisting of chloro and ethoxy, $m$ has the values 1, 2, and 3, $n$ has the values 1, 2, and 3, and $m+n$ equals, at most, 4, which process comprises reacting in the temperature range of from about −78° C. to 30° C. and in a liquid organic solvent sodium cyclopentadiene with a silane having at least one chlorine and at least one vinyl radical attached to the silicon atom, the remaining two valences of the silicon being attached to groups selected from the class consisting of vinyl, chloro and ethoxy.

6. The process for making cyclopentadienyl vinyl silanes which comprises reacting, in the temperature range of from about −78° C. to 30° C., and in a liquid organic solvent sodium cyclopentadiene with vinyl trichloro silane.

7. The process for making cyclopentadienyl vinyl silanes which comprises reacting, in the temperature range of from about −78° C. to 30° C., and in a liquid organic solvent sodium cyclopentadiene with vinyl diethoxy chloro silane.

References Cited in the file of this patent

UNITED STATES PATENTS

| | | |
|---|---|---|
| 2,238,669 | Wiley | Apr. 15, 1941 |
| 2,386,452 | Fleming | Oct. 9, 1945 |
| 2,563,074 | Schmerling | Aug. 7, 1951 |
| 2,667,501 | Martin | Jan. 26, 1954 |